Sept. 6, 1966  J. L. RUBRICIUS  3,270,713
SMALL ANIMAL CAGE
Filed Sept. 17, 1964  2 Sheets-Sheet 1
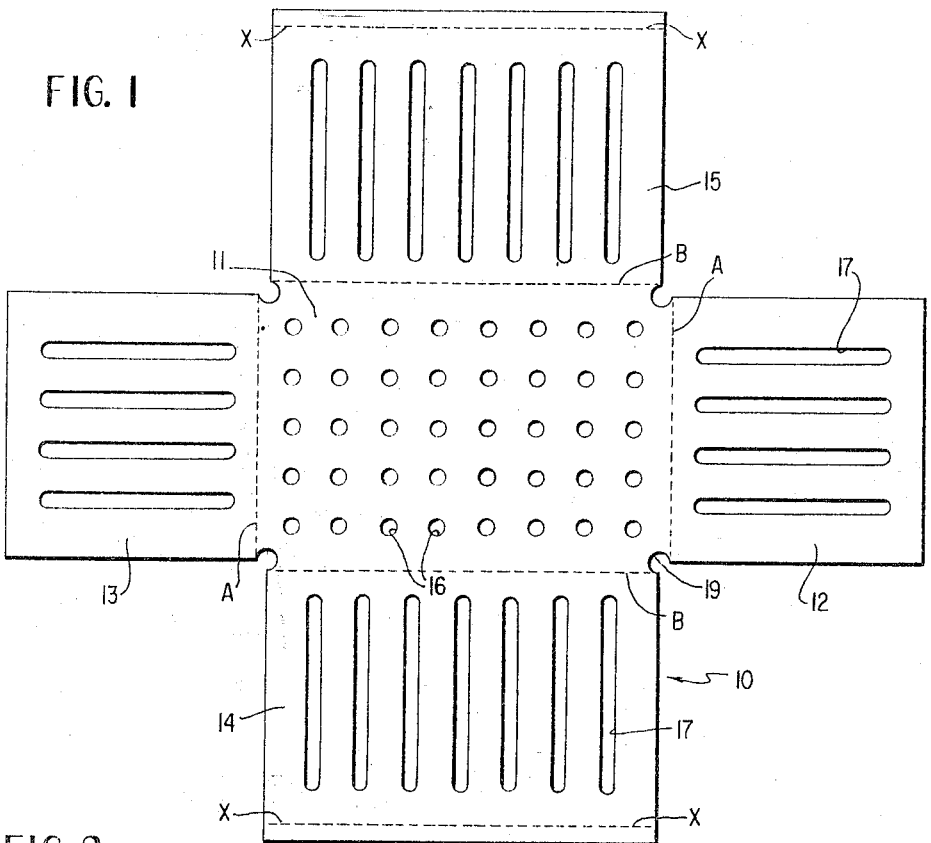
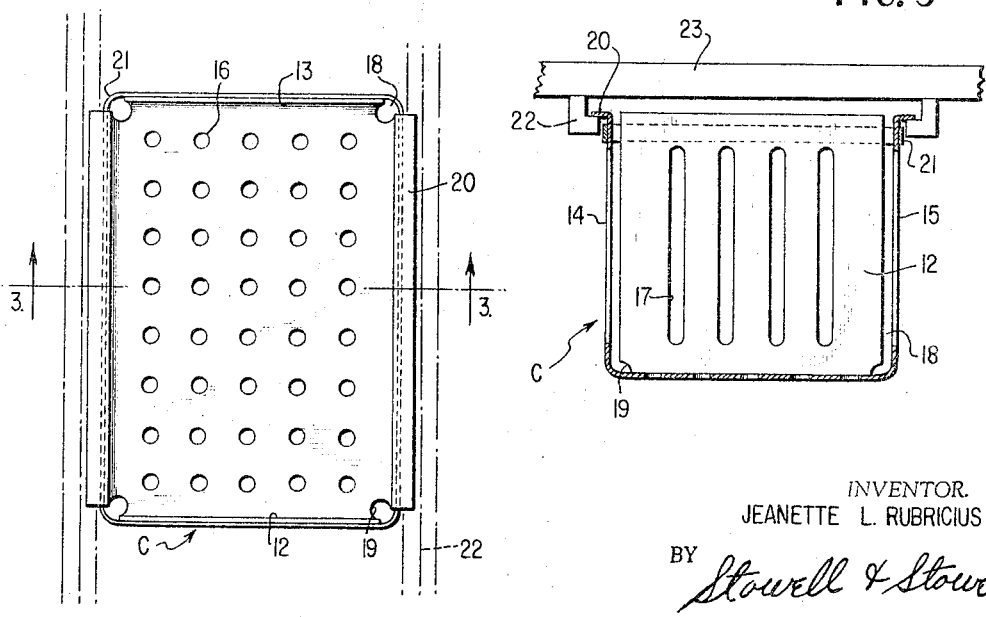
INVENTOR.
JEANETTE L. RUBRICIUS
BY Stowell & Stowell
ATTORNEYS.

United States Patent Office 3,270,713
Patented Sept. 6, 1966

3,270,713
SMALL ANIMAL CAGE
Jeanette L. Rubricius, 85—35 Midland Parkway, Jamaica, N.Y.
Filed Sept. 17, 1964, Ser. No. 397,107
2 Claims. (Cl. 119—17)

This invention relates to improved small animal cages and particularly to those fabricated from sheet material.

An objection inherent in the construction of small animal cages is the difficulty in keeping them clean, sanitary and free of contamination. Most prior art cages are very difficult to clean and consequently animals placed in cages previously occupied by diseased or infected animals are subjected to like disease or infection despite the usual efforts to clean the inside of these cages. It is found that an area where contamination is present, even after efforts are exerted to eliminate same, is the corner portion between each pair of adjacent side walls. These corner portions provide recesses where thorough and effective killing of harmful bacteria, etc. is very difficult.

An object of the present invention is to provide a small animal cage which is free of the above difficulty and can be economically and efficiently fabricated from sheet material, such as sheet metal.

Another object is to provide a small animal cage, the corner edge portions of which are open from end to end so that not only are these areas which are subject to contamination eliminated, but additional fenestrae are provided for light and ventilation.

A further object is to provide a small animal cage constructed of sheet material and of unitary form capable of being formed into position of use by roll-bending the side walls at right angles to the bottom wall, the cage being substantially free of connection between adjacent side walls thereby eliminating areas of contamination, and having simple mounting means making possible the suspending of the cage from a suitable hanger device.

Other objects and advantages of the invention will hereafter appear and, for purposes of illustration but not of limitation, embodiments of the invention are shown on the accompanying drawings, in which FIGURE 1 is a plan view of the blank from which the small animal cage is formed;

FIGURE 2 is a top plan view of the cage in position of use and showing the same suspended from supporting rails;

FIGURE 3 is a vertical sectional view taken substantially on the line 3—3 of FIGURE 2;

Figure 4:
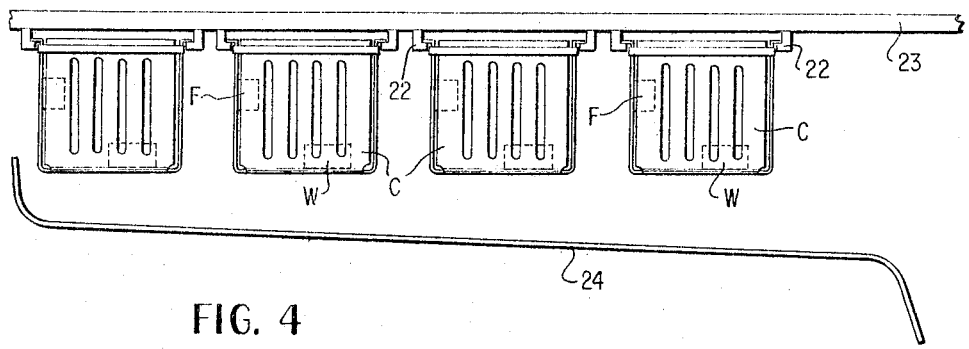
FIGURE 4 is an elevation showing a battery of cages mounted in position of use and provided with an inclined chute or slide on which excreta, droppings, etc. from the cage fall and discharge into a suitable receiver.

The embodiment of the invention illustrated in FIGS. 1 through 3 comprises a small animal cage which is formed from a cruciform blank 10 of sheet material, such as sheet metal. The blank has a rectangular bottom wall panel 11, with which are integral opposed rectangular end wall panels 12 and 13 and rectangular side wall panels 14 and 15. The end wall panels and side wall panels are bent upwardly at right angles to the bottom wall panel 11 substantially along the bend lines A and B, thereby providing a rectangular open top enclosure forming a small animal cage C. By bending the end and side wall panels with a gradual or roll-like bend, a smooth continuous curve is provided between the walls and the bottom panel 11. The smooth curves between the wall panels and the bottom panel eliminate zones which would otherwise provide collecting areas for dirt and the growth of harmful organisms.

The bottom wall panel 11 is foraminous by being provided with a plurality of closely spaced holes 16, through which excreta, droppings, feathers, etc. may fall. The side and end wall panels are each provided with suitable fenestrae in the form of parallel elongate slots 17 for providing air circulation and light.

In accordance with this invention the adjacent edges of the side and end wall panels are so dimensioned that when they are bent to the upright position of use there is a vertical gap or elongate slot 18 extending from top to bottom between each pair of adjacent panels, thereby eliminating corner recesses and affording additional ventilation and light for the interior of the cage. At each juncture of the adjacent side and end wall panels is a curvilinear cut-out 19, providing a hole at the bottom of each elongate slot 18, thereby further eliminating recesses which would otherwise serve as a source of contamination. The width of the slots 18 may be varied in accordance with the size of the animal to be enclosed within the cage, the larger the animal the wider the slots may be. It should be noted that the bend lines A and B are disposed in the blank 10, according to FIG. 1, at the outer side of the curvilinear cut-out 19, thereby to insure that the hole provided by the cut-out 19 constitutes the lower terminus of the respective slot 18.

The vertical dimension of the side wall panels 14 and 15 may be somewhat greater than that of the end wall panels 12 and 13 and the projecting edge portions of the side wall panels may be bent outwardly at right angles along the dotted lines X—X indicated on FIGURE 1 to form a pair of opposed suspending flanges 20 to enable the cage to be suspended from a suitable support.

In order to retain the side and end walls in the desired position of use, an enclosure strap 21, such as a metallic strap, surrounds the structure directly beneath the flanges 20, thereby to form a self-sustaining cage C.

As shown, a battery of cages C may be supported on and suspended from L-shaped hanger rails 22, which may be depended from a suitable supporting panel or ceiling 23. The arrangement is such as to space the top of the cage C slightly below the ceiling or support 23 sufficient to prevent the escape of the animal within the cage and afford ventilation.

Figure 5:
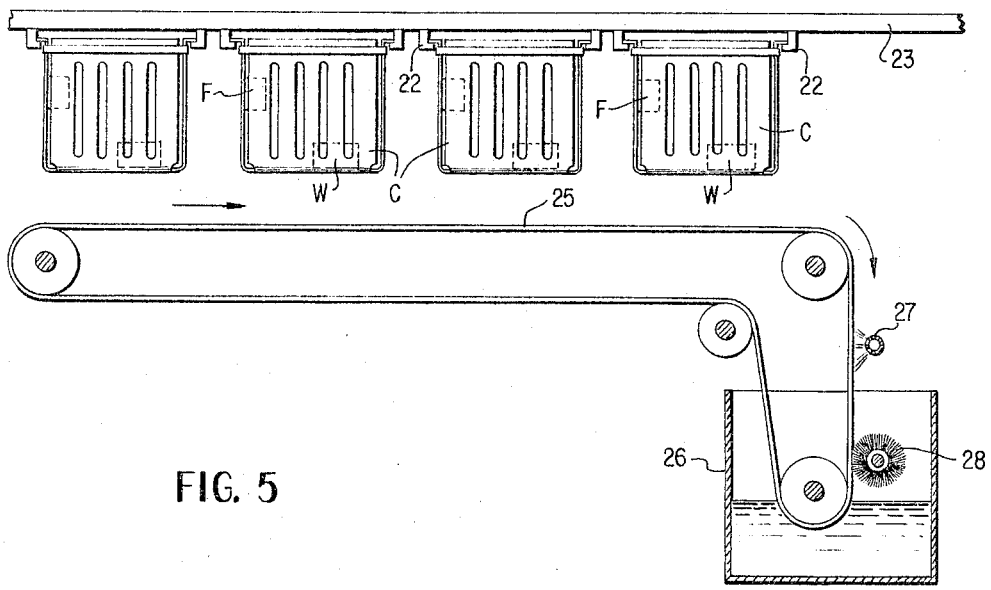
FIGURE 5 is a view similar to FIGURE 4 but showing an endless belt device for removing the droppings, excreta, etc. from the cages.

Indicated on FIGURES 4 and 5 are receptacles within the cage when in position of use. For example, a conventional water receptacle F may be supported in any suitable manner on an end wall panel of the cage. Similarly, at the bottom of the cage and resting on the bottom panel 11 may be positioned a feed receptacle W. Access to these receptacles and the animals is readily secured by sliding the cages C from their supporting rails 22.

In FIGURE 4 there is shown a downwardly inclined slide 24, onto which droppings, excreta, etc. may fall and slide downwardly to a suitable collecting receptacle (not shown).

It will be recognized that a plurality of rows of cages such as illustrated in FIGURES 4 and 5 may be positioned in vertically superposed arrangement and each row may be provided with its own debris collecting means.

FIGURE 5 shows a different system for disposing of excreta, etc. In this instance an endless belt 25 of L-form is trained over suitable rollers and the upper flight thereof moves in the direction of the arrows. A liquid containing receptacle 26 is arranged for the lower portion of the belt and into which droppings, etc. are collected. A spray 27 may serve to remove material from the belt and a rotary brush 28 within the receptacle acts to clean the belt. Any suitable means may be employed for driving the belt.

Example I

A rat cage having the following dimensions has been found to be very satisfactory:

| | Inches |
|---|---|
| Width of bottom panel | 8 |
| Length of bottom panel | 12 |
| Height of side panels | 8 |
| Width of slots 18 | ¼ |
| Width of slots 17 | ¼ |
| Diameter of openings 16 | ¼ |

Example II

A rabbit cage having the following dimensions has been found to be very satisfactory:

| | Inches |
|---|---|
| Width of bottom panel | 18 |
| Length of bottom panel | 24 |
| Height of side panels | 16 |
| Width of slots 16 | ½ |
| Width of slots 18 | ½ |
| Diameter of openings 16 | ½ |

Numerous changes in details of construction, arrangement and material may be effected without departing from the spirit of the invention as defined in the appended claims.

What I claim is:

1. A small animal cage comprising a unitary body of sheet material having an apertured quadrangular bottom wall panel and apertured side wall panels integral with said bottom panel and rising therefrom at approximately right angles, said bottom wall panel joining each of said side wall panels in a smoothly contoured curve, the length of each of said side walls being shorter than the corresponding edges of said bottom, whereby adjacent edges of said side wall panels are spaced from each other to provide elongate slots, when said side walls are positioned generally normal to the plane of said bottom wall panel, said slots terminating at their lower ends in holes in said bottom wall panel; strap means encircling the upper portions of said side wall panels for retaining same in predetermined position of use; and flanges on the upper ends of a pair of opposed side wall panels extending outwardly therefrom to rest upon supporting rails for suspension therefrom.

2. A small animal cage comprising a unitary body of relatively rigid sheet material having an apertured quadrangular bottom wall panel through which animal wastes are adapted to pass and apertured side wall panels integral with said bottom panel and rising therefrom at approximately right angles, said bottom wall panel joining each of said side wall panels in a smoothly contoured curve, the length of each of said side walls being shorter than the corresponding edges of said bottom, whereby adjacent edges of said side wall panels are spaced from each other to provide elongate slots, said sheet material being adapted to maintain the cage in a box-like form, when said side walls are positioned generally normal to the plane of said bottom wall panel, said slots terminating at their lower ends in openings in said bottom wall panel; flanges on the upper ends of a pair of opposed side wall panels extending outwardly therefrom and adapted to rest upon L-shaped supporting rails for suspension therefrom.

References Cited by the Examiner

UNITED STATES PATENTS

| | | | |
|---|---|---|---|
| 1,558,155 | 10/1925 | Flansburg | 229—16 |
| 2,257,734 | 10/1941 | Cornell | 119—21 |
| 2,279,670 | 4/1942 | Ford et al. | 229—16 X |
| 2,465,588 | 3/1949 | Hartman | 229—34 |
| 2,476,583 | 7/1949 | Burgoon | 229—16 |
| 2,813,653 | 11/1957 | Grossman | 220—41 |
| 2,887,263 | 5/1959 | Wright | 229—23 |

SAMUEL KOREN, *Primary Examiner.*

HUGH R. CHAMBLEE, *Assistant Examiner.*